(12) United States Patent (10) Patent No.: US 8,995,534 B2
Richardson et al. (45) Date of Patent: Mar. 31, 2015

(54) SYSTEMS AND METHODS FOR ENCODING AND DECODING

(75) Inventors: Iain E Richardson, Aberdeen (GB); Maja Bystrom, Belmont, MA (US)

(73) Assignee: Bevara Technologies, LLC, Belmont, MA (US)

( * ) Notice: Subject to any disclaimer, the term of this patent is extended or adjusted under 35 U.S.C. 154(b) by 64 days.

(21) Appl. No.: 13/212,127

(22) Filed: Aug. 17, 2011

(65) Prior Publication Data

US 2012/0069910 A1 Mar. 22, 2012

Related U.S. Application Data

(60) Provisional application No. 61/387,327, filed on Sep. 28, 2010, provisional application No. 61/384,686, filed on Sep. 20, 2010, provisional application No. 61/443,658, filed on Feb. 16, 2011, provisional application No. 61/443,660, filed on Feb. 16, 2011.

(51) Int. Cl.
| | |
|---|---|
| *H04B 1/66* | (2006.01) |
| *H04N 19/12* | (2014.01) |
| *H04N 19/70* | (2014.01) |
| *H04N 19/46* | (2014.01) |
| *H04N 19/162* | (2014.01) |

(Continued)

(52) U.S. Cl.
CPC .............. *H04N 19/12* (2014.11); *H04N 19/70* (2014.11); *H04N 19/46* (2014.11); *H04N 19/162* (2014.11); *H04N 19/164* (2014.11); *H04N 19/44* (2014.11)
USPC ..................................... 375/240.25; 386/328

(58) Field of Classification Search
CPC .......... H04N 7/26069; H04N 7/26223; H04N 7/26228; H04N 7/26313; H04N 7/26335; H04N 7/26946

USPC ................. 386/241, 326, 328; 348/726, 426, 348/429.1; 375/240.01–240.29
See application file for complete search history.

(56) References Cited

U.S. PATENT DOCUMENTS 5,987,181 A 11/1999 Makiyama et al.
6,181,711 B1 * 1/2001 Zhang et al. .................. 370/468

(Continued)

OTHER PUBLICATIONS

International Preliminary Report on Patentability issued in International Patent Application No. PCT/US2011/52401 on Mar. 22, 2013.

(Continued)

*Primary Examiner* — Behrooz Senfi
(74) *Attorney, Agent, or Firm* — Knobbe Martens Olson & Bear, LLP

(57) ABSTRACT

Systems and methods for multimedia encoding and decoding are disclosed. The systems and methods include multimedia format detection systems, decoder functionality generation systems, decoder instantiation systems, and multimedia processing engines which are capable of selecting a decoder or playback mechanism for each input encoded multimedia stream. The functionality of the decoder or playback mechanism is represented as syntax elements which may be further encoded. The functionality for decoding or playback is then stored or transmitted with the multimedia bitstream. Alternatively, the functionality and multimedia bitstream can be embedded in or associated with a second digital bitstream. Further, the functionality associated with an encoded multimedia stream can be used to instantiate a decoder or playback mechanism and the encoded multimedia stream decoded with the instantiated decoder or mechanism.

6 Claims, 5 Drawing Sheets

(51) Int. Cl.
*H04N 19/164* (2014.01)
*H04N 19/44* (2014.01)
*H04N 5/917* (2006.01)

(56) References Cited

U.S. PATENT DOCUMENTS

| | | | |
|---|---|---|---|
| 6,624,761 B2 | 9/2003 | Fallon | |
| 7,512,986 B2 | 3/2009 | Shen-Orr et al. | |
| 7,646,432 B2* | 1/2010 | Park et al. | 348/565 |
| 7,647,619 B2* | 1/2010 | Kashima | 725/146 |
| 2002/0010859 A1 | 1/2002 | Maeda | |
| 2002/0035544 A1 | 3/2002 | Wakao et al. | |
| 2002/0087999 A1* | 7/2002 | Kashima | 725/100 |
| 2003/0163430 A1 | 8/2003 | Takaku | |
| 2003/0193940 A1* | 10/2003 | Kugumiya | 370/389 |
| 2004/0028141 A1 | 2/2004 | Hsiun et al. | |
| 2004/0067043 A1 | 4/2004 | Duruoz et al. | |
| 2004/0221143 A1 | 11/2004 | Wise et al. | |
| 2006/0056506 A1 | 3/2006 | Ho et al. | |
| 2006/0087457 A1* | 4/2006 | Rachwalski et al. | 341/50 |
| 2006/0116966 A1 | 6/2006 | Pedersen et al. | |
| 2006/0227815 A1 | 10/2006 | Khan | |
| 2006/0248235 A1 | 11/2006 | Eyer | |
| 2007/0274340 A1 | 11/2007 | Raveendran et al. | |
| 2007/0296613 A1 | 12/2007 | Hussain et al. | |
| 2008/0013562 A1* | 1/2008 | Fujinami et al. | 370/429 |
| 2008/0052540 A1 | 2/2008 | Inokuchi et al. | |
| 2008/0066181 A1 | 3/2008 | Haveson et al. | |
| 2008/0294691 A1 | 11/2008 | Chang et al. | |
| 2009/0016446 A1 | 1/2009 | Yang et al. | |
| 2009/0086104 A1* | 4/2009 | Felder | 348/705 |
| 2009/0110067 A1* | 4/2009 | Sekiguchi et al. | 375/240.12 |
| 2009/0154556 A1* | 6/2009 | Kim et al. | 375/240.02 |
| 2009/0304115 A1 | 12/2009 | Pittaway et al. | |
| 2009/0310671 A1* | 12/2009 | Reynolds et al. | 375/240.01 |
| 2009/0313300 A1 | 12/2009 | Dettori et al. | |
| 2010/0027974 A1* | 2/2010 | Ansari | 386/124 |
| 2010/0046627 A1 | 2/2010 | Xiao et al. | |
| 2010/0195820 A1 | 8/2010 | Frank | |
| 2012/0069911 A1 | 3/2012 | Richardson et al. | |
| 2012/0072225 A1 | 3/2012 | Richardson et al. | |
| 2012/0250757 A1 | 10/2012 | Mabey et al. | |
| 2012/0323758 A1 | 12/2012 | Henning | |
| 2013/0188739 A1 | 7/2013 | Bystrom et al. | |

OTHER PUBLICATIONS

Avaro, et al., "The MPEG-4 Systems and Description Language :A Way Ahead in Audio Visual Information Representation", Signal Processing: Image Communication, vol. 9, No. 4., May 1997.

Bystrom et al., "A Fully Re-Configurable Universal Video Decoder", DASIP 09.

Kannangara et al., "A Universal Video Decoder for Fully Configurable Video Decoding" *ICCE* 2010.

Philip et al., "Decoder Description Syntax for Fully Configurable Video Coding", ICIP, Nov. 2009.

Richardson et al., "Fully Configurable Video Coding Part 1", ISO/IEC JTCI/SC20/WG11 document M16751, Jun. 2009.

Richardson et al., "Fully Configurable Video Coding Part 2", ISO/IEC JTCI/SC20/WG11 document M16752, Jun. 2009.

Richardson et al., "Implementing Fully Configurable Video Coding", ICIP, Nov. 2009.

Richardson et al., "A Framework for Fully Configurable Video Coding", PCS 2009.

International Preliminary Report on Patentability issued in International Patent Application No. PCT/US2011/52396 on Feb. 26, 2013.

International Preliminary Report on Patentability issued in International Patent Application No. PCT/US2011/52394 on Feb. 19, 2013.

International Search Report and the Written Opinion issued in International Patent Application No. PCT/US2013/23019 on Apr. 12, 2013.

European Telecommunications Standards Institute, Technical Specifications: Hybrid Broadcast Broadband TV, ETSI TS 102 796, (2012); 88 pages.

Gorin et al., "Just-In-Time Adaptive Decoder Engine: A Universal Video Decoder based on MPEG RVC", Proc 19th ACM Inter'l Conference on Multimedia, New York, NY—USA (2011), 4 pages.

Gorin et al., "Optimized dynamic compilation of dataflow representations for multimedia applications", Annal Telecommun, Springer Verlag (2013) 68(3-4):133-151.

ISO/IEC 14496-12 Information technology—Coding of audio-visual objects—Part 12 ISO base media file format; International Organization for Standardization—4th Edition (2012); 196 pages.

ISO/IEC 14496-14 Information technology—Coding of audio-visual objects—Part 14 MP4 file format; International Organization for Standardization—1st Edition (2003); 18 pages.

Richardson et al., "Dynamic transform replacement in an H.264 CODEC", 15th IEEE International Conference on Image Processing (ICEP 2008) pp. 2108-2111.

International Search Report and Written Opinion issued in International Patent Application No. PCT/US2011/052396 on Jan. 24, 2012.

International Search Report issued in International Patent Application No. PCT/US2011/052394 on Feb. 7, 2012.

OneCodec. "OneCodec: Future proof your media." (online) Sep. 23, 2011 1-10, 13-15 (23.0.2011) Available at http://vimeo.com/channels/239621/29476212 . Retrieved on Nov. 6, 2014.

Angus, Andrew. "Dropbox: Video Sharing and Photo Sharing Made Easy" [blog post] http://www.switchvideo.com/blog/2011/05/09/dropbox-video-sharing-and-photo-sharing-madeeasy/ May 9, 2011 Switch Video. Retrieved on Mar. 14, 2013.

\* cited by examiner

SYSTEMS AND METHODS FOR ENCODING AND DECODING

CROSS-REFERENCE TO RELATED APPLICATIONS

This application claims the benefit of the following U.S. Provisional Patent Applications: (1) U.S. App. No. 61/384,686, filed on Sep. 20, 2010; (2) U.S. App. No. 61/387,327, filed on Sep. 28, 2010; (3) U.S. App. No. 61/443,658, filed on Feb. 16, 2011; and (4) 61/443,660, filed on Feb. 16, 2011. Each of the above-referenced applications is hereby incorporated by reference in its entirety.

BACKGROUND

1. Field

The present technology relates to systems and methods for encoding and decoding audio/video and other digital data. More particularly, the technology relates to computer architecture and operating methods that can enable decoders to decode unsupported formats of audio/video and other multimedia.

2. Description of the Related Art

Digital audio/video and general digital multimedia capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital devices implement image and video encoding techniques or formats such as JPEG, GIF, RAW, TIFF, PBM, MPEG-2, MPEG-4, and H.264/MPEG-4, Part 10, Advanced Video Coding (AVC), to store, transmit and receive digital images and video efficiently. Digital devices implement audio encoding techniques or formats such as, AAC, MP3, and WAV to store, transmit, and receive digital audio efficiently. Digital devices further implement additional data and graphics encoding techniques or formats such as IGES, 3DT, PS, MNG, ODF and SVG.

Audio, video and other digital data are commonly encoded prior to transmission or storage by an encoder, e.g., a server. The encoding typically consists of operations such as compression or organization into a selected format. The audio, video and other digital data, collectively termed digital multimedia, may be independently stored or provided to a user. Alternatively, the digital multimedia may be embedded in other digital data provided to a user. For instance, an image, video, or animation may be part of an electronic newspaper article, an electronic slideshow, or a technical paper. In either case, the digital multimedia must be decoded prior to display by decoders resident on devices such as mobile devices, DVD players, Blu-Ray players, TV sets, tablets, laptops, computers, or set top boxes. However, a particular decoder may not support decoding of the format used by the encoder. For example, the format used by the encoder may be a legacy format no longer supported by decoders, or may be a new format that the decoder does not support.

Since different decoders may support different formats, traditionally digital multimedia needed to be coded in many different formats to support many different decoders. For example, a user downloading an audio/video file from a server through a network such as the Internet, may have many devices such as a mobile phone, a TV set, a laptop, etc. The downloaded content is traditionally in a single format. However, each of the user's devices may be configured to decode a different format. Accordingly, the user may need to download multiple versions of the audio/video data, each in a different format, for each of the decoders. This leads to bandwidth usage of the network for each version downloaded. Alternatively, the user might download and install a new decoder for each codec type on each device in order to decode the encoded multimedia. However, this solution requires that all legacy formats be supported on all devices. As a third alternative, the user may transcode (decode and re-encode) the digital multimedia received from the downloaded format to each format required for each device. However, this requires computational resources to decode the digital multimedia from the received format and re-encode the digital multimedia into the desired format. Further, this requires memory resources to store each copy of the digital multimedia in each of the desired formats. Additionally, decoding and re-encoding of digital data can lead to loss in quality due to both the loss in precision and the fact that decoding and encoding processes for multimedia data are often lossy as opposed to lossless processes.

One potential technique for avoiding transcoding and to adapt to video content is to provide switches between pre-determined standardized algorithms and tools as suggested in 1997 in Section 2.2.1 of "The MPEG-4 Systems and Description Language: A Way Ahead in Audio Visual Information Representation" by A. Ovaro, et al. As described in Section 2.2.1.3 of this document, the drawbacks include exhaustive specification of all configurations, difficulty of scaling up with increase in available tools, and challenges in anticipating future codec needs.

Similarly, a system for implementing reconfiguration of decoder algorithm elements using flexible or fixed libraries at both the encoder and decoder is proposed in Section 2.2.2 of "The MPEG-4 Systems and Description Language: A Way Ahead in Audio Visual Information Representation" by A. Ovaro, et al. and described in more detail "Whitepaper on Reconfigurable Video Coding (RVC)" ISO/IEC JTC1/SC20/WG11 document N9586 by E. Jang, et al. Information about which tools to select from a decoder library is transmitted either prior to encoded audio/video transmission or is embedded within the compressed audio/video bitstream. Systems for implementing intermittent configuration of algorithms are described in U.S. Pat. No. 5,987,181. Decoding tools or algorithms are selected from local libraries at the decoder through indicators embedded within the compressed bitstream. However, these approaches are limited to specific, pre-determined toolsets and restrict flexibility of systems.

Two systems for partially reconfiguring decoders without the use of local libraries at the decoder are given "Dynamic Replacement of Video Coding Elements" by Bystrom, et al. and "A Syntax for Defining, Communicating, and Implementing Video Decoder Function and Structure" by Kannagara, et al. The first transmits a tool for an inverse transform at the start of an encoded video frame or transmits a binary patch for replacing code in a decoder. The latter transmits encoded algorithms or data with the compressed video and adds the encoded algorithms to the decoder or replaces existing algorithms within the decoder.

SUMMARY

The systems, methods, and devices described herein each may have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description" one will understand how the features of this technology provide advantages that include, without being limited thereto, enabling decoders to decode unsupported multimedia formats.

One aspect of this disclosure is a multimedia processing engine. The multimedia processing engine comprises a format analyzer configured to determine the format of multimedia data. The engine also includes a functionality generator in communication with the format analyzer. The functionality generator is configured to select or generate functionality for decoding the multimedia data.

Another aspect of this disclosure is a multimedia processing engine comprising a functionality interpreter. The functionality interpreter is configured to receive data corresponding to a functionality. The functionality interpreter is further configured to generate the functionality based on the data. The engine also includes a functionality instantiator. The functionality instantiator is configured to generate a decoder based on the functionality. The decoder is configured to decode multimedia data.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

The following detailed description is directed to certain specific embodiments. However, the teachings herein can be applied in a multitude of different ways, including for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein. In this description, reference is made to the drawings wherein like parts are designated with like numerals throughout.

Various embodiments of systems and methods are described herein for encoding and decoding digital multimedia and/or functionality. In the embodiments described herein, the systems and methods may allow digital multimedia to be encoded and decoded in a more efficient manner. For example, the systems and methods described herein may allow for configuration of a decoder to support decoding of additional formats of multimedia. Further, the systems and methods may allow for any type of configuration, without requiring replacement of the decoder hardware or download of new configuration data from an alternate data source other than the data provided with the digital multimedia.

In one embodiment, the systems and methods described herein correspond to a reconfigurable decoder/receiver of digital multimedia. The systems and methods described herein further correspond to a multimedia analyzer/functionality generator configured to determine the coding format of encoded multimedia and generate syntax elements (e.g., codewords) for use by the receiver that are used to configure the decoder as further discussed below. It should be noted that certain embodiments described below may reference codewords, however, other syntax elements may be similarly used.

Figure 1:
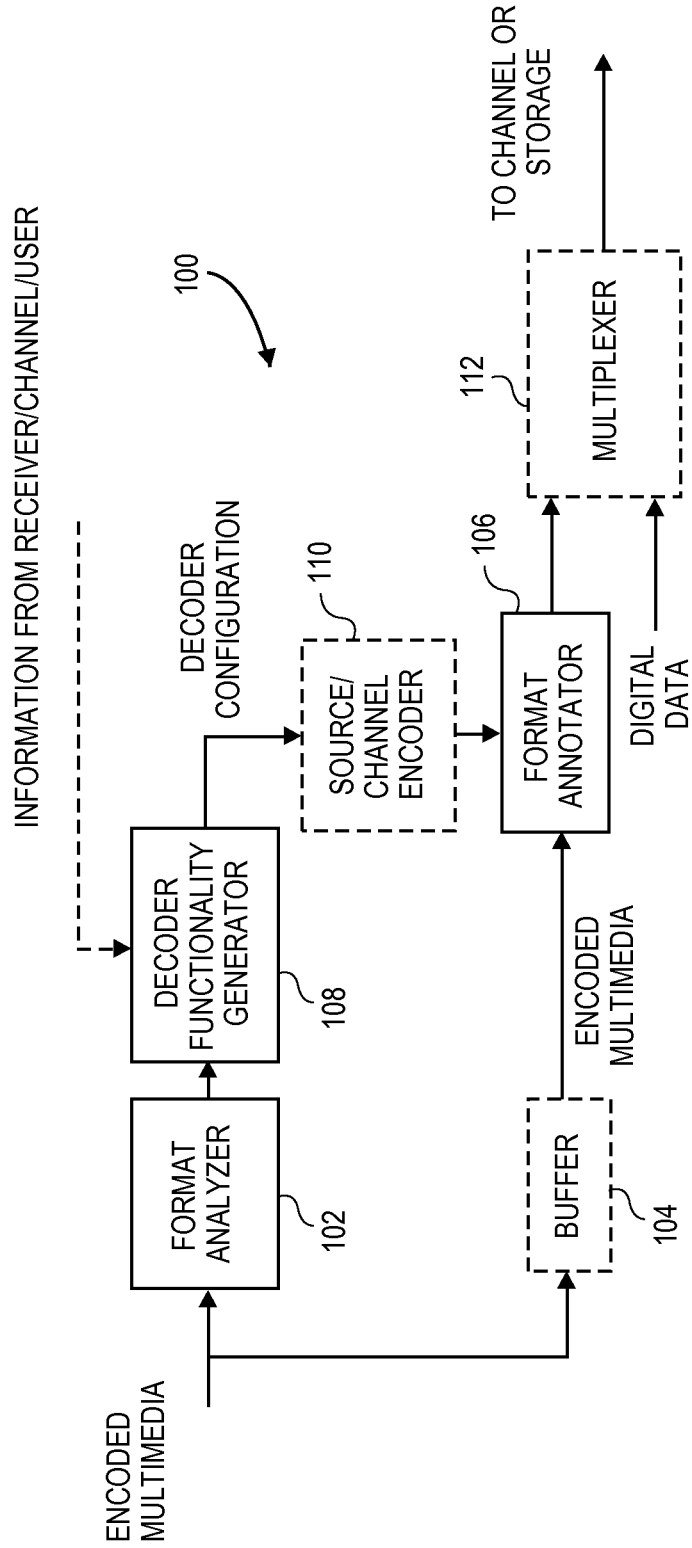
FIG. 1 is a block diagram illustrating a multimedia analyzer/functionality generator that performs techniques as described in this disclosure.

FIG. 1 is a block diagram illustrating a multimedia analyzer/functionality generator 100 that performs techniques as described in this disclosure. The multimedia analyzer/functionality generator 100 includes a format analyzer 102 and an optional first buffer 104 each configured to receive multimedia. The optional first buffer 104 is optionally in communication with a format annotator 106. The format analyzer 102 is in communication with a decoder functionality generator 108. The decoder functionality generator 108 is optionally in communication with an optional source/channel encoder 110, which is further in communication with the format annotator 106. Alternatively or additionally, the decoder functionality generator 108 is directly in communication with the format annotator 106. The format annotator 106 is optionally in communication with an optional multiplexer 112. The functionality of the components of the multimedia analyzer/functionality generator 100 is discussed in detail below.

The format analyzer 102 is configured to receive encoded multimedia data. The format analyzer 102 is configured to analyze the encoded multimedia in order to determine the format in which the multimedia is encoded. For example, the format analyzer 102 may compare the encoded multimedia against structures stored in a library such as a local library (e.g., a local memory store) of the format analyzer 102 or a non-local library (e.g., network storage), where different structures are associated with different formats. The structures may include, for example, file names, stream headers, formatting codes, etc. Based on the comparison to the structures, if a format with matching structures is found, the format analyzer 102 determines the format of the encoded multimedia. If matching structures are not found, the format analyzer may determine that the multimedia data are encoded in an unknown format. One of ordinary skill in the art should recognize that the format analyzer 102 may be configured to compare and/or analyze the multimedia to interpret a format in other manners as well. The format analyzer 102 further provides information about the detected format or a signal indicating an unknown format to the decoder functionality generator 108. In an alternate embodiment the format analyzer 102 may be configured to additionally receive a second encoded multimedia stream so that multiple streams may be processed in serial or in parallel. The format analyzer 102 is configured to analyze the second encoded multimedia data in order to determine the format in which the multimedia data are encoded. The format of the second encoded multimedia stream may differ from that of the first encoded multimedia stream. The format of the second stream is provided to the decoder functionality generator 108.

The decoder functionality generator 108 is configured to receive the information about the detected format or a signal indicating an unknown format from the format analyzer 102. If the format is known, then the decoder functionality generator 108 identifies one or more functionalities that are capable of decoding the detected format. The functionalities may further be stored in a local library or a non-local library. The decoder functionality generator 108 may then select a particular functionality based on the identified functionalities that are capable of decoding the detected format. In one embodiment, the decoder functionality generator 108 has only one functionality to select from the library per format. In another embodiment, the decoder functionality generator 108 is configured to receive functionality from a user as an input. In another embodiment the decoder functionality generator 108 may be configured to receive information about a detected format for a second input encoded multimedia stream from the format analyzer 102. The decoder functionality generator 108 may be configured to process the information about the detected formats of the first and second input encoded multimedia streams in parallel or in serial.

In another embodiment, the decoder functionality generator 108 has multiple functionalities to select from the library per format. Different functionalities may have different features such as type of post processing of decoded data, different temporal and spatial prediction algorithms, etc. Further, different functionalities may require different complexity of the decoder. For example, some functionalities may require more or less memory for storage of code and data elements. Some functionalities may require more or less computational power to execute. Some functionalities may require more or less time for the decoder to execute. Some functionalities may require more bandwidth to transmit over a communication channel. Accordingly, the decoder functionality generator 108 may optionally receive an input indicating information regarding the decoder to which the multimedia data are to be sent and/or information regarding the communication channel over which the multimedia data are to be sent. Based on this information, the decoder functionality generator 108 may select a particular functionality for decoding the determined format. For example, functionalities that require less bandwidth to transmit may be used when the information indicates that channel bandwidth is limited. Further, functionalities that require less power may be used when the information indicates the decoder has a particular constraint on power consumption. Further, functionalities that require less storage may be used when the information indicates the decoder has limited space, or a storage medium on which the functionality or encoded multimedia is stored has limited space. Further, compression performance of the decoding algorithms in terms of bitrate for a particular subjective or objective quality level may be used when information regarding this parameter is available. The decoder functionality generator 108 may be configured to weigh multiple points of information in selecting the functionality. The relative weights assigned to each point of information may be static or adjustable. One of ordinary skill in the art should understand similar selection processes for functionalities may be performed.

The decoder functionality generator 108 further sends information regarding the selected functionality to the optional source/channel encoder 110 or directly to the format annotator 106. In one embodiment the information corresponds to syntax elements such as codewords. The decoder functionality generator 108 maps the functionality to one or more syntax elements with optional overhead information. The overhead information may correspond to information used by the decoder to identify and/or decode the syntax elements such as a header that identifies the data as codewords. In another embodiment, the mapping function is performed by a functionality encoder that is part of a separate module than the decoder functionality generator 108. As an example, the decoder functionality generator 108 may generate or select from algorithms written in a specific language, such as C. The decoder functionality generator 108 or the external functionality encoder may then map the C-language instructions to bytecodes or other codewords with optional overhead information. In a further embodiment the functionality generator 108 sends information regarding the selected functionality corresponding to a second input encoded multimedia stream to the optional source/channel encoder 110 or directly to the format annotator 106. The information may be transmitted in sequence with the information regarding the selected functionality of a first encoded multimedia stream or may be sent separately from that of a first encoded multimedia stream.

The optional source/channel encoder 110 is configured to receive the syntax elements and optional overhead information from the decoder functionality generator 108 and to source and/or channel encode the syntax elements and overhead information. Source coding may include compression and various entropy encoding configurations may be used as would be understood by one of ordinary skill in the art. Various channel encoding configurations may be used as would be understood by one of ordinary skill in the art. Furthermore, joint source-channel coding may be used as would be understood by one of ordinary skill in the art. The source/channel encoder 110 may then transmit the encoded data to the format annotator 106.

The format annotator 106 is configured to receive the encoded multimedia from the optional buffer 104 or is in direct communication with the storage or other mechanism supplying the encoded multimedia. The format annotator 106 is further configured to receive the syntax elements and optional overhead information directly from the decoder functionality generator 108, or source and/or channel encoded syntax elements and optional overhead information from the source/channel encoder 110. In one embodiment, the format annotator 106 is configured to act as a multiplexer. Accordingly, the format annotator 106 is configured to multiplex the syntax elements and optional overhead information (source and/or channel encoded or not) with the encoded multimedia to form a single set of bits of data or bitstream corresponding to both pieces of data. In another embodiment, the format annotator 106 keeps the encoded multimedia and syntax elements and optional overhead information (source and/or channel encoded or not) as separate sets of bits of data or bitstreams.

The format annotator 106 then makes the bitstream(s) available to a receiver/decoder or a storage unit. Optionally, the format annotator 106 makes the bitstream(s) available to an optional multiplexer 112. In one embodiment, the optional multiplexer 112 is configured to receive the bitstream(s) from the format annotator 106 and multiplex the bitstream(s) with a second digital data stream. The second digital data stream which is input to the optional multiplexer 112 may be an electronic document, a web page, or other electronic data. In another embodiment, the optional multiplexer 112 is configured to receive the bitstream(s) from the format annotator 106 and multiplex the bitstream(s) with a second digital data stream and overhead. The overhead may consist of information such as synchronization codes, identification information, and additional access mechanism instructions. The optional multiplexer 112 then outputs the multiplexed bitstream to a receiver/decoder or a storage unit. For example, the format annotator 106 may output the bitstream(s) or the optional multiplexer 112 may output the multiplexed bitstream to a storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media (e.g., DVD, Blu-Ray, CD, etc.), and the like. The storage medium may be accessible by the receiver/decoder. Additionally or alternatively, the format annotator 106 outputs the bitstream(s) or the optional multiplexer 112 outputs the multiplexed bitstream for wired or wireless transmission to the receiver/decoder. For example, the format annotator 106 outputs the bitstream(s) or the optional multiplexer 112 outputs the multiplexed bitstream to an appropriate transceiver and/or modem for transmitting the bitstream(s) to the receiver/decoder over one or more communication channels. Any known wired and/or wireless protocol may be used such as, IEEE 802.11 standards, including IEEE 802.11(a), (b), or (g), the BLUE-TOOTH standard, CDMA, GSM, TDMA, Ethernet (IEEE 802.3), and/or USB. The receiver/decoder may utilize the bitstream(s) to configure a decoder to decode the encoded multimedia data as discussed in further detail below with respect to FIG. 2.

Figure 2:
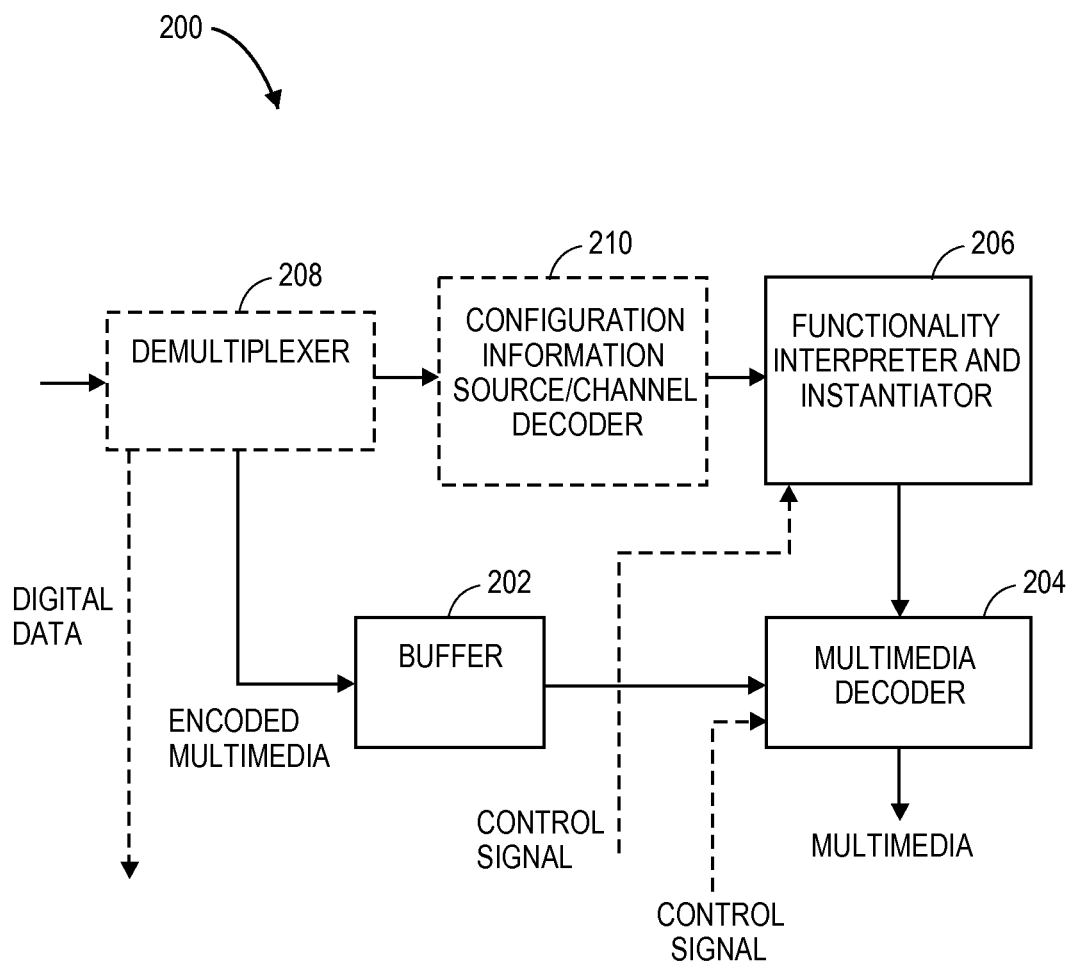
FIG. 2 is a block diagram illustrating a multimedia receiver/decoder that performs techniques as described in this disclosure.

FIG. 2 is a block diagram illustrating a multimedia receiver/decoder that performs techniques as described in this disclosure. The receiver/decoder 200 includes a buffer 202 in communication with a multimedia decoder 204. The multimedia decoder 204 is further in communication with a functionality interpreter and instantiator 206. The receiver/decoder 200 optionally includes a demultiplexer 208 in communication with the buffer 202 and the functionality interpreter and instantiator 206 (directly or via a configuration information entropy decoder 210). The receiver/decoder 200 further optionally includes the configuration information source/channel decoder 210 in communication with the functionality interpreter and instantiator 206. The configuration information source/channel decoder 210 is further in communication with the optional demultiplexer 208, if the format annotator 106 or the optional multiplexer 112 included in the format analyzer/functionality generator 200 creates a joint bitstream. The functionality of components of the multimedia receiver/decoder 200 is described in further detail below.

The presence or absence of optional components in the receiver/decoder 200 may be based on the configuration of components of a corresponding multimedia analyzer/functionality generator (e.g., multimedia analyzer/functionality generator 100) that sends encoded multimedia data and/or functionality to the receiver/decoder 200 for decoding. For example, if multimedia data are sent from an encoder to the receiver/decoder 200 is multiplexed as discussed above with respect to the format annotator 106 and optional multiplexer 112 components of FIG. 1, the receiver/decoder may include the demultiplexer 208 to demultiplex the multiplexed data. In addition, if the data received from the encoder are source and/or channel encoded as discussed above with respect to FIG. 1, the receiver/decoder 200 may include the source and/or channel decoder 210 to decode the data.

The buffer 202 is configured to receive encoded multimedia that has been processed by a multimedia format analyzer/functionality generator such as discussed above with respect to FIG. 1. The buffer 202 may receive the encoded multimedia data as a bitstream directly from the multimedia analyzer/functionality generator. Alternatively, the multimedia format analyzer/functionality generator may send a bitstream with the encoded multimedia multiplexed with syntax elements and optional overhead information corresponding to functionality. In another embodiment, the multimedia format analyzer/functionality generator may send a multiplexed bitstream with the encoded multimedia multiplexed with syntax elements and optional overhead information corresponding to functionality and further multiplexed with a second digital data stream and optional overhead. Accordingly, the demultiplexer 208 receives the bitstream and demultiplexes the data into an encoded multimedia data bitstream with the encoded multimedia data and a functionality data bitstream with both the syntax elements and optional overhead information and an optional second data stream. The demultiplexer 208 then sends the encoded multimedia data bitstream to the buffer 202. The demultiplexer 208 further sends the functionality data bitstream to the configuration information source/channel decoder 210 and/or the functionality interpreter and instantiator 206. In a second embodiment, the demultiplexer 208 receives the multiplexed bitstream and demultiplexes the data into an encoded multimedia data bitstream with the encoded multimedia data and a functionality data bitstream with the codewords and first and second sets of optional overhead information.

The configuration information source/channel decoder 210 is configured to source and/or channel decode the functionality data bitstream when the data are source and/or channel encoded by the corresponding encoder. The configuration information source/channel decoder 210 is configured to send the decoded functionality data bitstream to the functionality interpreter and instantiator 206. In a further embodiment, if functionality data corresponding to a second encoded multimedia stream are transmitted by the multimedia analyzer/functionality generator 100 or received from a storage medium then the configuration information source/channel decoder 210 may be configured to receive the encoded functionality data corresponding to the second stream. Further, the configuration information source/channel decoder 210 may be configured to process functionality data corresponding to multiple compressed multimedia streams in serial or in parallel.

The functionality interpreter and instantiator 206 receives the functionality data bitstream, which includes syntax elements and optional first and second overhead information, as discussed above. The functionality interpreter and instantiator 206 maps the syntax elements to the correct functionality. For example, the syntax elements may map to functionality such as processing elements, structures, and or code segments. Based on these syntax elements, the functionality interpreter and instantiator 206 interconnects, parameterizes, or adds to existing syntax elements used by the multimedia decoder 204. The functionality interpreter and instantiator 206 generates machine code or hardware organization and links the code or organization with the multimedia decoder 204, thus configuring the multimedia decoder 204 based on the received functionality. In a further embodiment, if functionality data corresponding to a second encoded multimedia stream are transmitted by the multimedia analyzer/functionality generator 100 then the functionality interpreter and instantiator 206 may be configured to receive the functionality data corresponding to the second stream. Further, the functionality interpreter and instantiator 206 may be configured to process functionality data corresponding to multiple encoded multimedia streams in serial or in parallel. In another embodiment, the functionality interpreter and instantiator 206 may delay some or all of its operations until triggered by an optional control signal.

The multimedia decoder 204 is configured by the functionality interpreter and instantiator 206 as discussed above. The multimedia decoder 204 further receives the multimedia data to be decompressed according to the received functionality from the buffer 202. The multimedia decoder 204 decompresses the encoded multimedia data and outputs the decoded multimedia data. In a further embodiment, if functionality data corresponding to a second encoded multimedia stream is transmitted by the multimedia analyzer/functionality generator 100 then the multimedia decoder 204 may be configured to decompress the second stream. Further, the multimedia decoder 204 may be configured to process the multiple compressed multimedia streams in serial or in parallel. In another embodiment, the multimedia decoder 204 may delay decoding the encoded multimedia data until triggered by an optional control signal. The multimedia decoder 204 may comprise a field programmable gate array (FPGA) or other suitable configurable circuitry.

Figure 3:
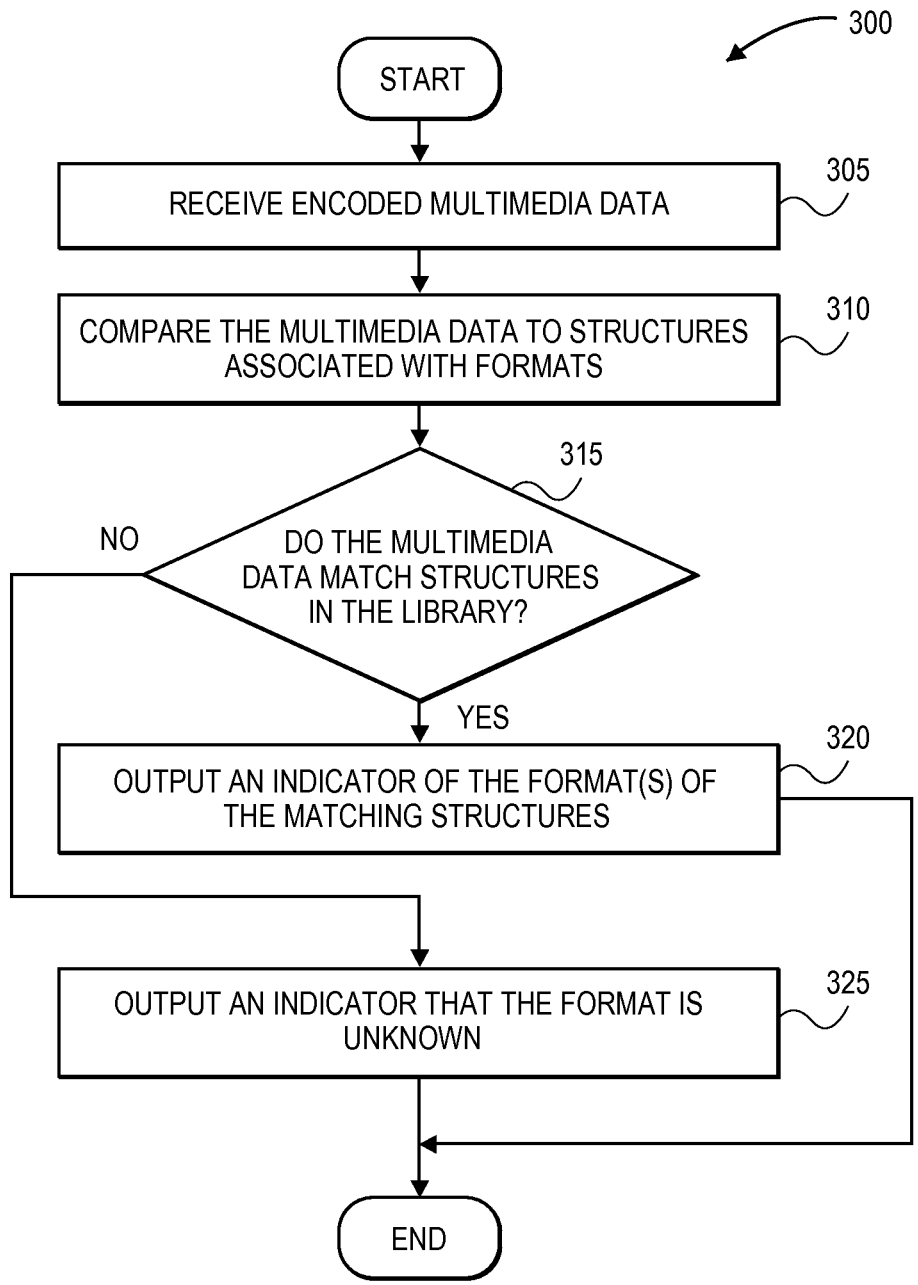
FIG. 3 is a flowchart illustrating an exemplary process for analyzing the format of multimedia data.

FIG. 3 is a flowchart illustrating an exemplary process 300 for analyzing the format of multimedia data. Starting at a step 305, encoded multimedia data are received at a multimedia format analyzer. Continuing at a step 310, the multimedia format analyzer compares the encoded multimedia data to structures (e.g., file names, stream headers, formatting codes, etc.) associated with formats. Further at a step 315, the multimedia format analyzer determines whether or not the multimedia data match structures in the library. If, at step 315, the multimedia format analyzer determines the multimedia data match structures in the library, the process continues to a step 320. At the step 320 the multimedia format analyzer outputs an indicator of the format(s) associated with the matching structures. If at step 315, the multimedia format analyzer determines the multimedia data do not match structures in the library, the process continues to a step 325. At the step 325 the multimedia format analyzer outputs an indicator that the format of the multimedia data is unknown.

Figure 4:
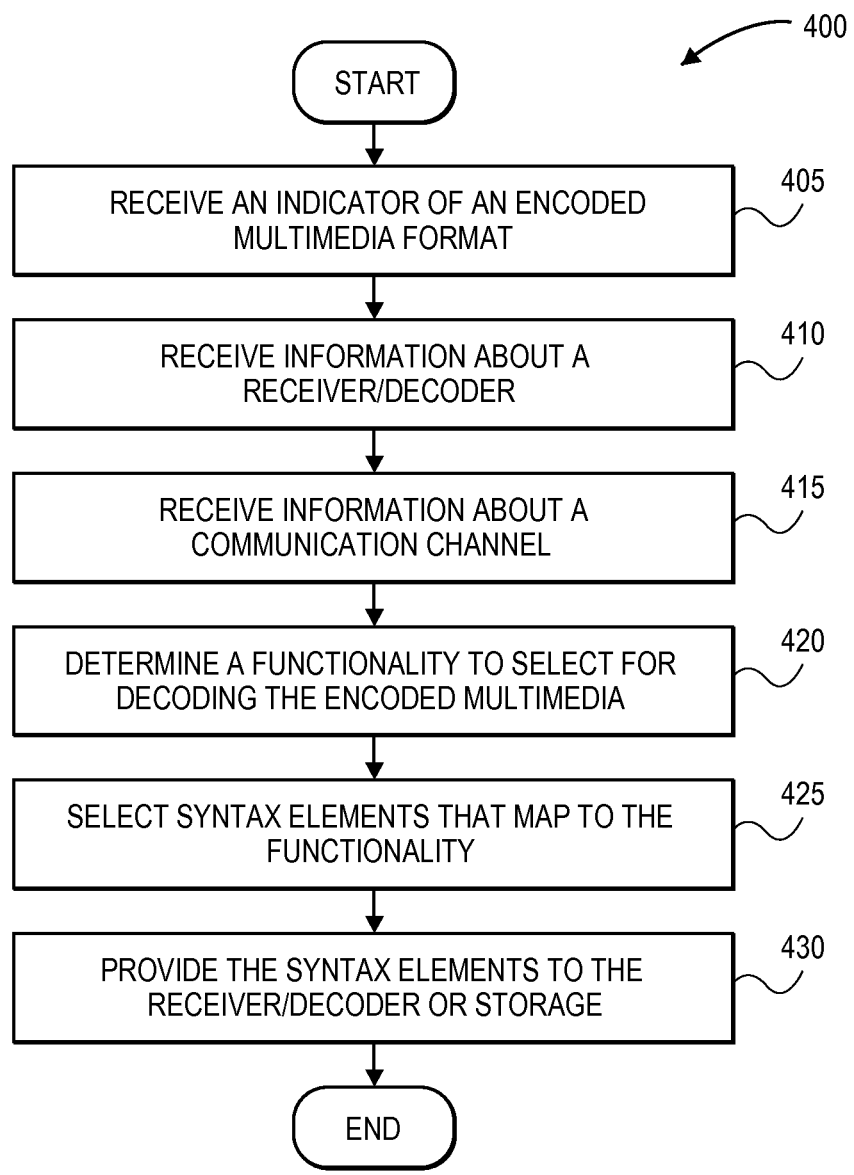
FIG. 4 is a flowchart illustrating an exemplary process for generating functionality for a decoder.

FIG. 4 is a flowchart illustrating an exemplary process 400 for generating functionality for a decoder. Starting at a step 405, the multimedia decoder functionality generator receives an indicator of a multimedia format. Continuing at a step 410, the multimedia decoder functionality generator optionally further receives information about a receiver/decoder. The information may include information regarding memory, processor, mobility, or power constraints, etc. of the decoder. Further, at a step 415, the multimedia decoder functionality generator further optionally receives information about a communication channel over which encoded multimedia and/or functionality information is to be sent to the receiver/decoder. The information may include bandwidth limitations, load, etc. Next, at a step 420, the multimedia analyzer/functionality generator determines which functionality to select for decoding multimedia data of the indicated multimedia format based on the received indicator, optional information about the decoder, and/or optional information about the communication channel. Continuing at a step 425, the multimedia analyzer/functionality generator selects syntax elements such as codewords that map to the selected functionality. Further at a step 430, the multimedia decoder functionality generator may provide the syntax elements to the receiver/decoder or storage.

Figure 5:
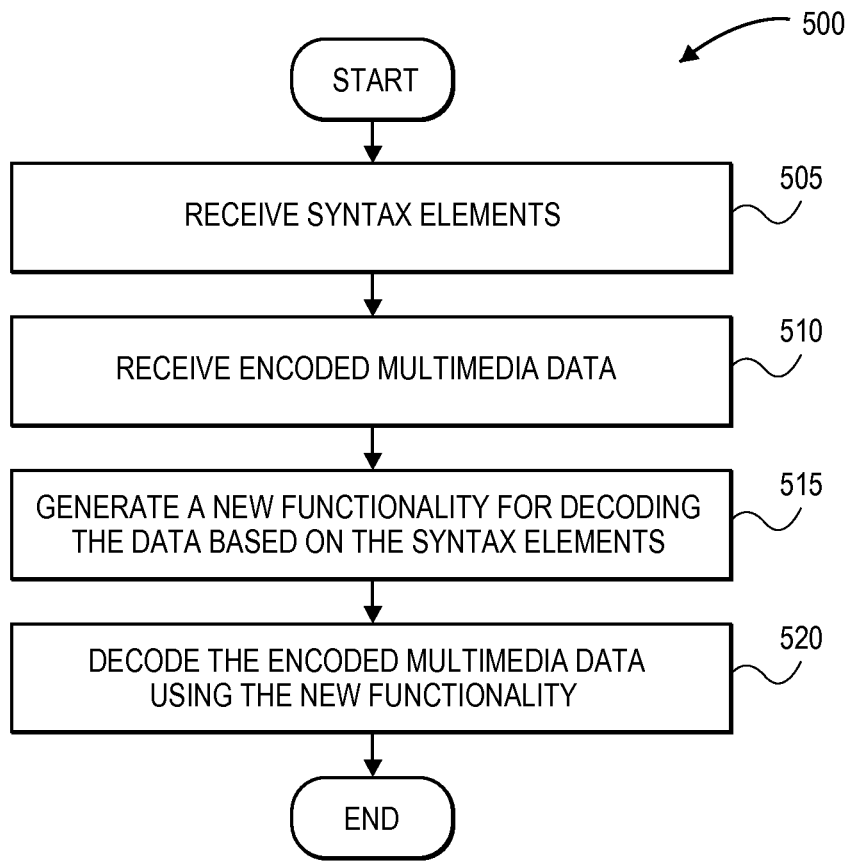
FIG. 5 is a flowchart illustrating an exemplary process for generating a decoder.

FIG. 5 is a flowchart illustrating an exemplary process 500 for generating a decoder. At a step 505, the receiver/decoder receives syntax elements such as codewords. Continuing at a step 510, the receiver/decoder additionally receives encoded multimedia data. Further at a step 515, the decoder generates a new functionality for decoding the encoded multimedia data based on the received syntax elements. Next at a step 520, the decoder decodes the encoded multimedia data using the new functionality.

One of ordinary skill in the art should recognize that various steps may be added or omitted from the processes 300, 400, and 500. Further, the various steps of the processes 300, 400, and 500 may be performed in a different order than described above.

The technology is operational with numerous other general purpose or special purpose computing system environments or configurations. Examples of well known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN), personal area network (PAN), or Wide Area Network (WAN) may be a home or corporate computing network, including access to the Internet, to which computers and computing devices comprising the system are connected. In one embodiment, the LAN conforms to the Transmission Control Protocol/Internet Protocol (TCP/IP) industry standard.

As used herein, multimedia, multimedia data, digital data, and digital multimedia refer to images, graphics, sounds, video, animations, electronic documents, scientific data, or any other digital data type data that is entered into the system.

As used herein, encoded digital data refers to data that are stored or held in a data format, which may be compressed or uncompressed.

As used herein, decode refers to decompression, interpretation, playback or conversion.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules/components as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

A web browser comprising a web browser user interface may be used to display information (such as textual and graphical information) to a user. The web browser may comprise any type of visual display capable of displaying information received via a network. Examples of web browsers include Microsoft's Internet Explorer browser, Netscape's Navigator browser, Mozilla's Firefox browser, PalmSource's Web Browser, Apple's Safari, or any other browsing or other application software capable of communicating with a network.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the above description has pointed out novel features of the technology as applied to various embodiments, the skilled person will understand that various omissions, substitutions, and changes in the form and details of the device or process illustrated may be made without departing from the scope of the instant technology. Therefore, the scope of the technology is defined by the appended claims rather than by the foregoing description. All variations coming within the meaning and range of equivalency of the claims are embraced within their scope.

What is claimed is:

1. A multimedia processing engine comprising:
    a format analyzer configured to determine the format of encoded audio/video data;
    a functionality generator in communication with the format analyzer, the functionality generator being configured to select or generate hardware and software platform independent functionality that decodes the audio/video data encoded in the determined format;
    the functionality generator being further configured to generate or select hardware and software platform independent syntax elements that contain information to create and implement a new functionality that decodes the audio/video data encoded in the determined format in a receiver in which decoding of audio/video data encoded in the determined format is unsupported; and
    a multiplexer configured to multiplex the encoded audio/video data with the syntax elements and send the multiplexed data and syntax elements to a non-transient storage medium as a single set of bits.

2. The multimedia processing engine of claim 1, wherein the functionality for decoding the audio/video data is stored in a library associated with the functionality generator.

3. The multimedia processing engine of claim 1, wherein the functionality for decoding the audio/video data is selected from functionality received from a user.

4. The multimedia processing engine of claim 1, wherein the syntax elements comprise codewords.

5. The multimedia processing engine of claim 1, further comprising a transmitter configured to transmit the syntax elements to a decoder.

6. A multimedia processing engine comprising:
    a demultiplexer configured to demultiplex from a non-transient storage medium a single set of bits encoding audio/video data and hardware and software platform independent syntax elements sufficient for creating and implementing functionality that decodes the encoded audio/video data and that is unsupported by the multimedia processing engine prior to receiving the single set of bits;
    a functionality interpreter configured to:
        receive the syntax elements; and
        create and implement the new functionality based on the syntax elements; and
    a functionality instantiator configured to generate a decoder based on the created and implemented functionality, wherein the decoder is configured to decode the encoded audio/video data using the implemented functionality.

* * * * *